United States Patent
Brenner et al.

(10) Patent No.: US 12,427,822 B2
(45) Date of Patent: Sep. 30, 2025

(54) WHEEL SUSPENSION FOR A VEHICLE

(71) Applicant: Bayerische Motoren Werke Aktiengesellschaft, Munich (DE)

(72) Inventors: Markus Brenner, Munich (DE); Norbert Deixler, Unterhaching (DE); Malte Flake, Pfaffenhofen a. d. Ilm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/686,137

(22) PCT Filed: Aug. 2, 2022

(86) PCT No.: PCT/EP2022/071706
§ 371 (c)(1),
(2) Date: Feb. 23, 2024

(87) PCT Pub. No.: WO2023/025542
PCT Pub. Date: Mar. 2, 2023

(65) Prior Publication Data
US 2024/0375470 A1    Nov. 14, 2024

(30) Foreign Application Priority Data

Aug. 25, 2021   (DE) ............. 10 2021 122 012.2

(51) Int. Cl.
*B60G 11/14*  (2006.01)
*B60G 7/00*   (2006.01)
*B60G 13/00*  (2006.01)

(52) U.S. Cl.
CPC .......... *B60G 13/005* (2013.01); *B60G 7/008* (2013.01); *B60G 11/14* (2013.01); *B60G 2202/12* (2013.01); *B60G 2206/50* (2013.01)

(58) Field of Classification Search
CPC ...... B60G 13/005; B60G 7/008; B60G 11/14; B60G 2202/12; B60G 2206/50; B60G 11/006; B60G 7/005; B60G 7/006
See application file for complete search history.

(56) References Cited

U.S. PATENT DOCUMENTS

| 6,241,267 B1 * | 6/2001 | Dziadosz | B60G 7/001 |
| | | | 280/124.135 |
| 2002/0043780 A1 * | 4/2002 | Sandahl | B60G 11/08 |
| | | | 280/124.135 |

(Continued)

FOREIGN PATENT DOCUMENTS

| DE | 20 2014 101 432 U1 | 5/2014 |
| DE | 10 2017 006 216 A1 | 1/2018 |

(Continued)

OTHER PUBLICATIONS

Chang, FR 2863206 A1, Machine Translation of Specification (Year: 2005).*

(Continued)

*Primary Examiner* — Paul N Dickson
*Assistant Examiner* — Matthew Joseph Ganci
(74) *Attorney, Agent, or Firm* — Crowell & Moring LLP

(57) ABSTRACT

A wheel suspension for a vehicle, comprising: at least one wheel guiding element which connects a steering knuckle to a vehicle bodywork, and a spring-based and/or vibration-based damping element functioning like a shock-absorber strut or a suspension strut or a spiral spring, wherein the spring-based and/or vibration-based damping element is connected to the steering knuckle, wherein the wheel guiding element has a through-opening in the vehicle vertical direction, and wherein the spring-based and/or vibration-based damping element is located such that it protrudes through the through-opening.

3 Claims, 2 Drawing Sheets

(56) References Cited

U.S. PATENT DOCUMENTS

| | | | |
|---|---|---|---|
| 2009/0026724 A1* | 1/2009 | Hirai | B60G 3/20 |
| | | | 280/124.134 |
| 2018/0001725 A1 | 1/2018 | Andou et al. | |
| 2020/0198427 A1 | 6/2020 | Kallert et al. | |
| 2021/0170822 A1 | 6/2021 | Stangl | |

FOREIGN PATENT DOCUMENTS

| | | |
|---|---|---|
| DE | 10 2017 215 112 A1 | 2/2019 |
| DE | 10 2018 214 289 A1 | 2/2020 |
| FR | 2863206 A1 * 6/2005 | ........... B60G 21/055 |

OTHER PUBLICATIONS

International Search Report (PCT/ISA/210) issued in PCT Application No. PCT/EP2022/071706 dated Sep. 21, 2022, with English translation (4 pages).

German-language Written Opinion (PCT/ISA/237) issued in PCT Application No. PCT/EP2022/071706 dated Sep. 21, 2022, with English translation (9 pages).

German-language Search Report issued in German Application No. 10 2021 122 012.2 dated Sep. 7, 2022, with partial English translation (10 pages).

\* cited by examiner

WHEEL SUSPENSION FOR A VEHICLE

BACKGROUND AND SUMMARY

The present disclosure relates to a wheel suspension for a vehicle.

In respect of the prior art, reference is made, by way of example, to DE 10 2017 215 112 A1 and to DE 10 2018 214 289 A1.

The prior art discloses different connections of the spring-damper system (in particular of the vibration damper) in a wheel suspension for a vehicle.

In particular for reducing the required installation height of vibration dampers supported on a wheel-guiding link, it is known to not provide a bearing of the vibration damper and usually of the damper tube, by means of which bearing the damper tube is supported on the wheel guiding element, such as a transverse link of a vehicle wheel suspension for example, below the damper tube or below a damper tube base part as usual, but rather on the side of the damper tube. For example, DE 10 2017 215 112 A1 discloses a vibration damper in a wheel suspension for a vehicle, which vibration damper is supported on a wheel guiding element of the wheel suspension by means of two elastic bearings which are provided on the side of a damper tube of the vibration damper, and are situated diametrically opposite each other with respect to this damper tube. However, this concept of the bearing of the spring and/or damper system on the wheel guiding element can provide only a limited damper transmission ratio, which is not or only marginal from a functional point of view.

It is also known to connect the spring-damper system, or in particular, the vibration damper, to the wheel carrier. For example, such a connection can be identified in DE 10 2018 214 289 A1. However, one disadvantage of such a connection is that the required damper length can be implemented only with difficulty, or not at all, on account of a lack of installation space.

An object of the present disclosure is therefore to disclose a wheel suspension of a vehicle, which wheel suspension can resolve the abovementioned conflict in objectives, between as high a damper transmission ratio as possible, and at the same time, a sufficient damper length.

The present disclosure proposes a wheel suspension for a vehicle, in particular for a motor vehicle. The wheel suspension is preferably a wheel suspension of a non-steered axle of the vehicle, in particular, a rear axle. As an alternative, the axle may also be an axle that is steerable only with small steering angles, for example, a rear axle with rear axle steering.

The vehicle is preferably a two-track vehicle, wherein the wheel suspension is arranged on each axle side, wherein the identical wheel suspensions are arranged symmetrically to each other with respect to a vehicle center longitudinal axis.

The wheel suspension comprises at least one wheel guiding element. This wheel guiding element is designed, in particular, as a transverse link, for example, as a simple sheet-metal link. As an alternative, the wheel guiding element can also be designed as a triangular link, or a trapezoidal link, or the like. The wheel guiding element connects a wheel carrier of the wheel suspension to a vehicle body, in particular, to an axle support of the vehicle. For this purpose, the wheel guiding element can be connected, for example, in an articulated manner to the wheel suspension, or to the vehicle body.

Furthermore, the wheel suspension comprises a spring and/or a vibration damper element. The spring and/or a vibration damper element can be designed here, for example, in the form of a damper strut, or in the form of a helical spring (that is to say, only the vibration damper, or only the spring, separately). As an alternative, it is also possible for the spring and/or the vibration damper element to be designed in the form of a spring strut, that is to say a (for example, helical) spring, in combination with a vibration damper.

The spring and/or the vibration damper element are/is oriented at least approximately in the vehicle vertical direction here.

The spring and/or the vibration damper element is also connected to the wheel carrier. This connection is preferably made via a corresponding joint or bearing. The spring and/or the vibration damper element is also connected to the vehicle body, in particular, to a vehicle chassis. Owing to the connection of the spring and/or the vibration damper element to the wheel carrier, in particular, owing to a connection to the wheel carrier in a position very far at the bottom, when viewed in the vehicle vertical direction, a correspondingly sufficiently long damper length can be ensured.

However, in order that this sufficient or unrestricted damper length on account of the only just available installation space can be ensured, provision is also made for the wheel guiding element to comprise a passage opening in the vehicle vertical direction, the spring and/or the vibration damper element (that is to say, the damper strut, or the spring strut, or the helical spring) being arranged in a manner inserted through or projecting through the passage opening.

For this purpose, the wheel guiding element is designed in particular convexly in the position of the passage opening, so that a sufficiently wide passage opening can be ensured.

The passage opening is preferably designed in such a way that the spring and/or the vibration damper element can pass through in the event of all spring/steering movements.

The wheel guiding element is preferably arranged in a lower link plane of the wheel suspension here. The wheel guiding element is therefore located in a plane which is spanned by it (and possibly, at least one further wheel guiding element) and is provided below the wheel rotation axis when viewed from a vehicle vertical axis. This has the advantage that the spring and/or the vibration damper element can be guided through the wheel guiding element, and therefore can be connected to the wheel carrier further below (when viewed in the vehicle vertical direction). A sufficiently long damper length can be ensured in this way.

The present disclosure therefore addresses the conflict in objectives between sufficient damper or spring length, and as high a damper or spring transmission ratio as possible.

In a refinement of the disclosure, the wheel guiding element is oriented at least approximately in the vehicle transverse direction, or designed as a transverse link. Provision is also made here for the transverse link to be arranged in front of a wheel center axis or wheel rotation axis when considered in the vehicle direction of travel (during forward travel of the vehicle). An arrangement of this kind has advantages particularly in respect of the distribution of forces and the flow of forces, and also in respect of optimizing installation space.

The wheel suspension preferably comprises at least one further wheel guiding element, for example, a further transverse link, or what is known as a spring link, or a longitudinal link, or a sickle link.

Here, the further wheel guiding element is preferably likewise located in the lower link plane and can, for example, with the first-mentioned wheel guiding element, span the mentioned lower link plane.

The further wheel guiding element, in particular, when it is likewise arranged in the lower link plane, is preferably behind the wheel center axis, or the wheel rotation axis, when viewed in the vehicle direction of travel (during forward movement of the vehicle).

An embodiment with a further wheel guiding element, which is arranged behind the wheel center axis, is advantageous particularly when the first wheel guiding element (with the passage opening) is arranged in front of the wheel center axis.

The further wheel guiding element is particularly what is known as a spring link, on which a helical spring is supported. In particular, when a damper strut is guided through the first wheel guiding element, the further wheel guiding element is then a spring link of the kind in which a helical spring for fulfilling the spring function is supported.

As an alternative, it is also conceivable for the first wheel guiding element (that is to say, that which comprises the passage opening) to be arranged behind the wheel center axis.

A damper strut and/or a spring strut can then project through such a wheel guiding element (first wheel guiding element arranged behind the wheel center plane). The further wheel guiding element, for example, in the form of an abovementioned spring link, can then be arranged in front of the wheel center axis, or wheel rotation axis.

The first wheel guiding element and the further wheel guiding element are each preferably located in a mentioned lower link plane.

As an alternative, it is also possible for the two mentioned wheel guiding elements to be located in an upper link plane, or to span such an upper link plane. The upper link plane is a plane which is spanned by the wheel guiding elements and is provided above the wheel rotation axis, when viewed in the vehicle vertical direction.

As already mentioned further above, it is also possible as an alternative for the spring and damper function to be combined in a common component, what is known as the spring strut. A separate helical spring, which is supported on a spring link, can then be saved. In the case of a spring strut, the entire spring strut (as a spring and vibration damper element) projects through the passage opening in the first wheel guiding element.

In a further embodiment, the connection of the spring and/or vibration damper element, which projects through the passage opening in the wheel guiding element, to the wheel carrier is arranged below the connection of the wheel guiding element to the wheel carrier, when viewed in the vehicle vertical direction. This has the advantage that the entire axle or wheel suspension can therefore be of compact design, when viewed in the vehicle vertical direction. This compact design allows the end of the damper strut, viewed in the vehicle vertical direction, to be formed in a lower position, and therefore, more luggage compartment volume, which is valued by customers, or more loading width, to be ensured.

These and further features are disclosed in the claims, the description, and the drawings, it being possible for the individual features to be implemented in each case on their own, or severally in the form of subcombinations in an embodiment of the disclosure, and represent advantageous and independently protectable designs, for which protection is claimed here.

BRIEF DESCRIPTION OF THE DRAWINGS

The disclosure will be explained further below with reference to an exemplary embodiment.

DETAILED DESCRIPTION OF THE DRAWINGS

Figure 1:
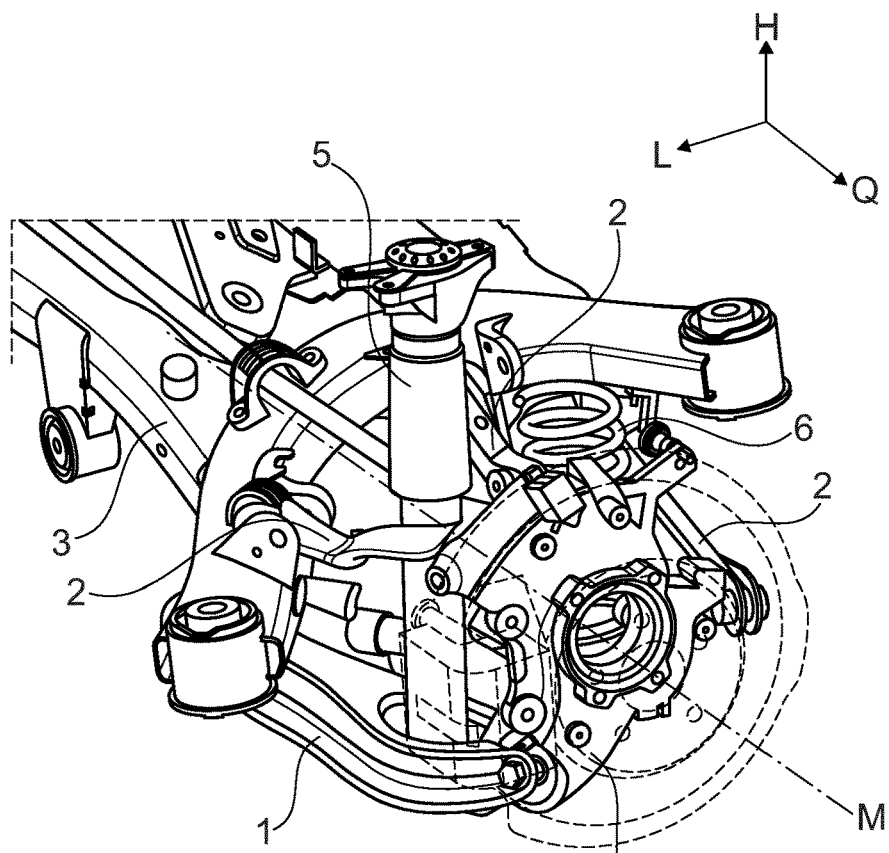
FIG. 1 shows a three-dimensional view of an exemplary wheel suspension obliquely from the front.

The wheel suspension according to FIG. 1 comprises a first wheel guiding element 1, which is designed in the form of what is known as a transverse link. The first wheel guiding element is oriented at least approximately in the vehicle transverse direction Q. The wheel suspension also comprises further wheel guiding elements 2, which in this specific case, are likewise designed as transverse links, and are oriented at least approximately in the vehicle transverse direction Q. All wheel guiding elements 1, 2 connect a vehicle body, which is formed by an axle support 3 in this case, to a wheel carrier 4 of the vehicle here. The wheel guiding elements 1, 2 are connected to the axle support 3 or to the wheel carrier 4 via bearings or joints here.

Figure 3:
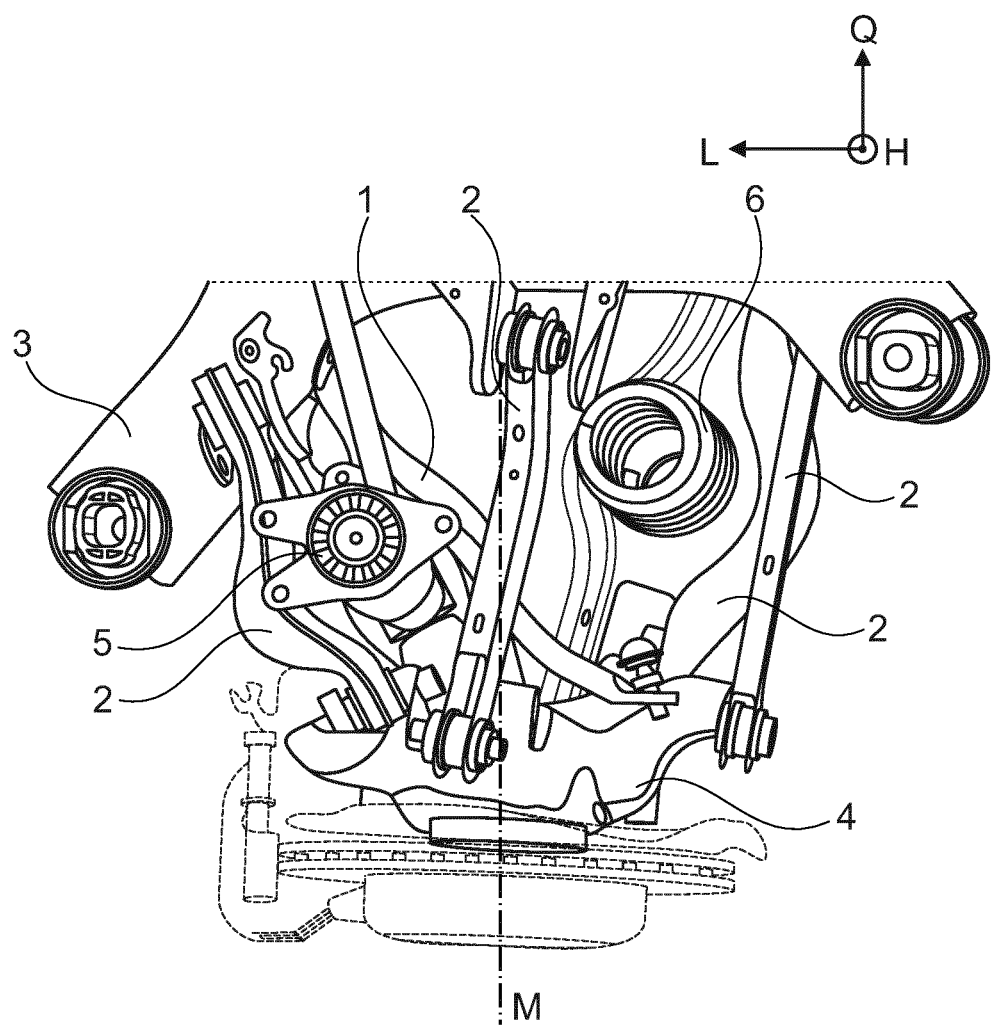
FIG. 3 shows a three-dimensional top view of the wheel suspension.

As shown in FIG. 1, and in particular, in FIG. 3, the wheel suspension also comprises what is known as a damper strut 5 and a helical spring 6 arranged separately from this damper strut 5.

The damper strut 5 and the helical spring 6 serve to damp or cushion vibrations of the wheel with respect to the chassis of the vehicle. Therefore, they are both, that is to say, both the helical spring 6 and the damper strut 5, at their upper end when viewed in the vehicle vertical direction H, supported on a vehicle chassis or vehicle body, not depicted. Both the damper strut 5 and the helical spring 6 are arranged oriented at least approximately in the vehicle vertical direction H.

Figure 2:
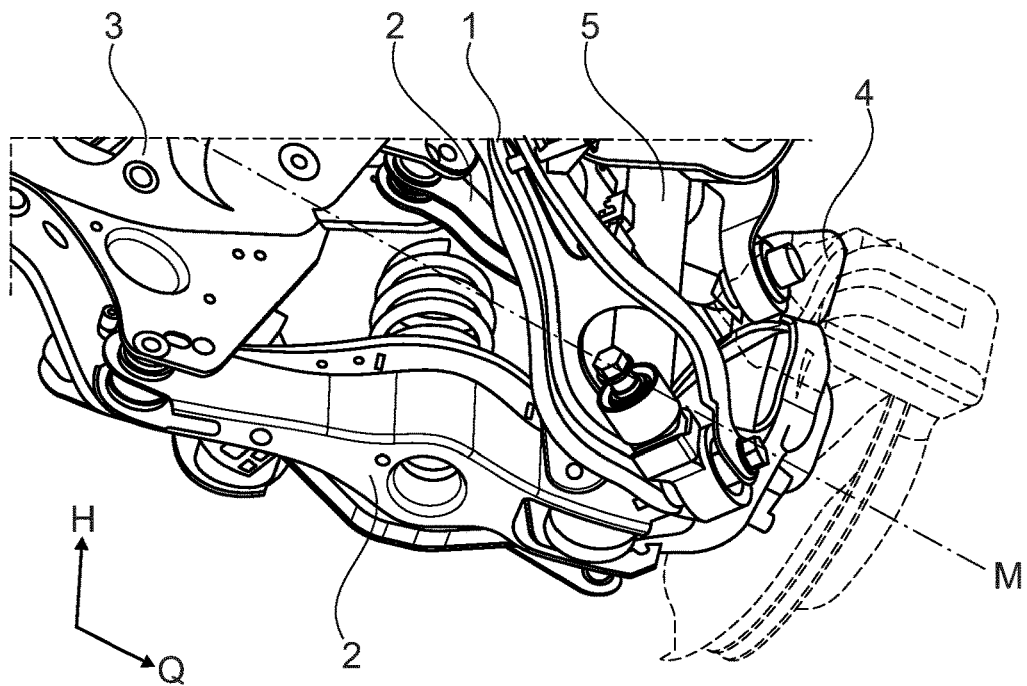
FIG. 2 shows a view of the wheel suspension from FIG. 1 from below.

Here, the damper strut 5 is mounted, by way of its lower end, on the wheel carrier 4. The connection of the damper strut 5 to the wheel carrier 4 is clearly shown, in particular, in FIG. 2, in the view of the wheel suspension from below.

Here, the damper strut 5 is arranged in a manner projecting through a passage opening 1.1 in the first wheel guiding element 1. For this purpose, the first wheel guiding element 1 comprises a passage opening 1.1 which is arranged in the first wheel guiding element 1 in a concavely formed position. The passage or insertion of the damper strut 5 through the first wheel guiding element 1 allows the damper strut 5 to be connected to the wheel carrier 4 in a very deep position, when viewed in the vehicle vertical direction. This deep connection to the wheel carrier 4 allows sufficiently high damper transmission ratio, and at the same time, a greater damper strut length.

As shown in FIG. 3, in particular, the helical spring 6, in contrast to the damper strut 5, is not connected to or supported on the wheel carrier 4, but rather one of the wheel guiding elements 2 (here referred to as spring links).

Both the spring link 2, on which the helical spring is supported, or on which the helical spring rests, and the first wheel guiding element 1, through which the damper strut 5 projects, are arranged in a lower link plane. This lower link plane is spanned by the first wheel guiding element 1, the spring link 2, and a further of the wheel guiding elements 2 (which is designed as what is known as a toe link in this case), the first wheel guiding element 1 and the spring link 2 being provided below the wheel rotation axis R, when viewed in a vehicle vertical axis H.

The first wheel guiding element 1 is arranged in front of the wheel center axis M, or the wheel rotation axis in the vehicle direction of travel L (which is also the vehicle longitudinal direction L in this case), when viewed during forward travel of the vehicle here, while the spring link 2 is arranged behind the wheel center axis M.

In this exemplary embodiment, two of the further wheel guiding elements 2 are located in an upper link plane (that is to say, above the wheel center axis M, when viewed in the vehicle vertical direction H).

The invention claimed is:

1. A wheel suspension for a vehicle, comprising:
   a first wheel guiding element which connects a wheel carrier to a vehicle body, the first wheel guiding element being i) arranged in a lower link plane positioned below a wheel rotation axis, ii) oriented at least approximately in a vehicle transverse direction, and iii) arranged in front of a wheel center axis in a vehicle direction of travel when viewed during forward travel,
   a second wheel guiding element, which is i) arranged in the lower link plane positioned below a wheel rotation axis, ii) oriented at least approximately in the vehicle transverse direction, and iii) arranged behind the wheel center axis in the vehicle direction of travel when viewed during forward travel, and
   a spring and/or a vibration damper element in the form of a damper strut or a spring strut or a helical spring,
   wherein the spring and/or vibration damper element is connected to the wheel carrier from below the connection of the first wheel guiding element to the wheel carrier when viewed in a vehicle vertical direction,
   wherein the first wheel guiding element comprises a passage opening in a vehicle vertical direction, and,
   wherein the spring and/or the vibration damper element is arranged projecting through the passage opening.

2. The wheel suspension according to claim 1, wherein the spring and/or vibration damper element, which projects through the first wheel guiding element, is a damper strut, and wherein a helical spring is connected to the second wheel guiding element.

3. The wheel suspension according to claim 1, wherein the passage opening on the first wheel guiding element is configured such that the spring and/or vibration damper element project through the passage opening in a freely moveable manner during any spring and/or steering movements.

* * * * *